United States Patent
Ijdo et al.

(10) Patent No.: US 9,562,146 B2
(45) Date of Patent: Feb. 7, 2017

(54) COMPOSITE COMPOSITIONS FOR POLYMERS AND ORGANOCLAY COMPOSITIONS HAVING QUATERNARY AMMONIUM ION HAVING ONE OR MORE BRANCHED ALKYL SUBSTITUENTS

(71) Applicant: Elementis Specialties, Inc., East Windsor, NJ (US)

(72) Inventors: Wouter Ijdo, Yardley, PA (US); David Dino, Cranbury, NJ (US)

(73) Assignee: Elementis Specialties, Inc., East Windsor, NJ (US)

( * ) Notice: Subject to any disclaimer, the term of this patent is extended or adjusted under 35 U.S.C. 154(b) by 0 days.

(21) Appl. No.: 14/329,305

(22) Filed: Jul. 11, 2014

(65) Prior Publication Data

US 2016/0009900 A1   Jan. 14, 2016

(51) Int. Cl.
C08K 3/34 (2006.01)
C08K 5/19 (2006.01)
C08K 9/04 (2006.01)

(52) U.S. Cl.
CPC .............. C08K 5/19 (2013.01); C08K 3/346 (2013.01); C08K 9/04 (2013.01)

(58) Field of Classification Search
CPC ................................ C08K 5/19; C08K 3/346
USPC ....................................................... 524/442
See application file for complete search history.

(56) References Cited

U.S. PATENT DOCUMENTS

| | | | |
|---|---|---|---|
| 4,024,189 A | 5/1977 | Davis | |
| 4,371,469 A | 2/1983 | Foglia et al. | |
| 4,683,336 A | 7/1987 | Blackhurst | |
| 4,994,620 A | 2/1991 | Fong et al. | |
| 5,112,519 A | 5/1992 | Giacobbe et al. | |
| 5,634,969 A | 6/1997 | Cody et al. | |
| 5,677,473 A | 10/1997 | Tomifuji et al. | |
| 5,739,087 A | 4/1998 | Dennis | |
| 5,849,960 A | 12/1998 | Singleton et al. | |
| 5,879,589 A * | 3/1999 | Miyanaga et al. | 252/500 |
| 6,008,181 A | 12/1999 | Cripe et al. | |
| 6,020,303 A | 2/2000 | Cripe et al. | |
| 6,150,322 A | 11/2000 | Singleton et al. | |
| 6,262,162 B1 | 7/2001 | Lan et al. | |
| 6,335,312 B1 | 1/2002 | Coffindaffer et al. | |
| 6,946,567 B2 | 9/2005 | Zhang et al. | |
| 7,098,353 B2 | 8/2006 | Zhang et al. | |
| 7,119,137 B2 * | 10/2006 | Darlington et al. | 524/445 |
| 7,148,375 B2 | 12/2006 | Edwards et al. | |
| 7,342,136 B2 | 3/2008 | Kenneally et al. | |
| 7,462,730 B2 | 12/2008 | Raney et al. | |
| 7,528,191 B2 | 5/2009 | Metzemacher et al. | |
| 7,629,406 B2 | 12/2009 | Qian et al. | |
| 7,781,390 B2 | 8/2010 | Singleton et al. | |
| 8,193,270 B2 | 6/2012 | Marx et al. | |
| 8,278,383 B2 | 10/2012 | Chan et al. | |
| 8,440,297 B2 | 5/2013 | Lopez et al. | |
| 2004/0042988 A1 | 3/2004 | Raney et al. | |
| 2011/0263884 A1 | 10/2011 | Ngo et al. | |
| 2011/0275844 A1 | 11/2011 | Ngo et al. | |
| 2014/0080748 A1 * | 3/2014 | Price | C11D 1/37 510/228 |

OTHER PUBLICATIONS

Oleksy et al., Polimery, 52(5), 345-350, 2007.*
Dailey Jr., et al., Conversion of Methyl Oleate to Branched-Chain Hydroxy Fatty Acid Derivatives, J. Am Oil Chem Soc (2009) 86, pp. 1101-1114.
D.V. Kinsman, Isostearic and Other Branched Acids, J. Am. Oil Chemists' Soc., vol. 56, Nov. 1979, pp. 823-827.
Ngo, et al., Zeolite-Catalyzed Isomerization of Oleic Acid to Branched-Chain Isomers, Eur. J. Lipid Sci, Technol. 108, (2007), pp. 214-224.
Cason et al., Branched-Chain Fatty Acids XII. Preparation of Branched and Normal Acids for Use in the Study of Melting Points of Binary Mixtures, The Chemical Laboratory of the University of California, Aug. 2, 1949, pp. 139-147.
Svensson et al., The Relationship Between the Structure of Monoalkyl Branched Saturated Fatty Acids and Some Physical Properties, The American Oil Chemists' Society, Lipids, vol. 28., No. 10, (1993), pp. 899-902.
Hansen et al., The Branched-Chain Fatty Acids of Butterfat, Fats Research Laboratory, Department of Scientific and Industrial Research, Wellington, NZ, vol. 50, May 16, 1951, pp. 207-210.
Biermann et al., Synthesis of Alkyl-Branched Fatty Acids, Eur. J. Lipid Sci., Technol., (2008), 110, pp. 805-811.
Sydow, Erik Von, A Microscopic Investigation of Binary Systems of Long Normal and Iso-Chain Carboxylic Acids, Acta Chemica Scandinavica 8, No. 9, 1954, pp. 1513-1518.
Zhang et al., New Process for the Production of Branched-Chain Fatty Acids, Journal of Surfactants and Detergents, vol. 7, No. 3, Jul. 2004, pp. 211-215.
Ngo et al., Process and Cost Modeling of Saturated Branched-Chain Fatty Acid Isomer Production, Ind. Eng. Chem. Res., (2012), 51, pp. 12041-12045.
Ngo et al., Synthesis and Physical Properties of Isostearic Acids and Their Esters, Eur. J. Lipid Sci. Technol., (2011), 113, pp. 180-188.

* cited by examiner

*Primary Examiner* — Hui Chin
(74) *Attorney, Agent, or Firm* — Morgan, Lewis & Bockius, LLP

(57) ABSTRACT

A composite composition comprising a polymeric resin; n organoclay compositions where a phyllosilicate clay is exchanged with quaternary ammonium ions having a formula of $[NR^1R^2R^3R^4]^+$ wherein at least one of $R^1$, $R^2$ and $R^3$ is a mixture of branched alkyl groups.

27 Claims, No Drawings

COMPOSITE COMPOSITIONS FOR POLYMERS AND ORGANOCLAY COMPOSITIONS HAVING QUATERNARY AMMONIUM ION HAVING ONE OR MORE BRANCHED ALKYL SUBSTITUENTS

FIELD OF THE INVENTION

The present invention relates to a composite composition of a polymeric resin and an organoclay composition wherein a phyllosilicate clay is exchanged with a quaternary ammonium ion having one or more branched alkyl substituents.

BACKGROUND OF THE INVENTION

Organoclays have been widely utilized as rheology modifiers for paint and coatings, inks, greases, oil well drilling fluids to increase the viscosity of such system. Organoclays find also use as additives in plastics to improve a variety of properties such as barrier, mechanical, anti-static and flame retardant properties. Organoclay are typically prepared by the reaction of an organic cation, in particular a quaternary ammonium ion, with a clay in various methods known in the art. If the organic cation contains at least one alkyl group containing at least 8 to 22 carbon atoms, then such organoclays have the property of increasing viscosity in organic based systems. The viscosity increasing properties can be modified by changing the substituents of the quaternary ammonium ion. For example, reports describe that the viscosity efficiency of organoclays was increased by substituting an alkyl group of the quaternary ammonium ion with a 2-hydroxyethyl group, a polyoxyethylene group and ester groups. However, the previously described organoclay compositions do not address the problems associated with viscosity increase of paint and coatings, inks, greases, oil well drilling fluids with decreasing temperature.

SUMMARY OF THE INVENTION

In one embodiment, the present disclosure provides for a composite composition comprising a polymeric resin and an organoclay composition. The organoclay composition comprises: a phyllosilicate clay; and quaternary ammonium ions having a formula of $[N-R^1R^2R^3R^4]^+$ wherein one or more of $R^1$, $R^2$ and $R^3$ is a mixture of branched alkyl groups, each branched alkyl group having 12 to 22 total carbon atoms, a linear backbone and one or more $C_1$ to $C_3$ branching alkyl groups, wherein the branching alkyl groups are distributed at different carbon positions along the linear backbone of the branched alkyl group; and wherein when one or more of $R^2$ and $R^3$ are not branched alkyl groups, one or more of $R^2$ and $R^3$ are a first linear alkyl group having 1 to 22 total carbon atoms. $R^4$ is selected from the group consisting of: a second linear alkyl group having 1 to 6 carbon atoms, an aryl group, and combinations thereof. In some embodiments, each branched alkyl group has 12 to 18 total carbon atoms. In some embodiments, each branched alkyl group has 14 to 18 total carbon atoms. In some embodiments, one or more of $R^2$ and $R^3$ are each a first linear alkyl group having 12 to 22 total carbon atoms; 1 to 6 total carbon atoms or 7-11 total carbon atoms. In some embodiments, $R^4$ is independently a benzyl group, a methyl group, an ethyl group, a propyl group, a butyl group, a pentyl group or a hexyl group. In some other embodiments, one or more of $R^2$ and $R^3$ are methyl and $R^4$ is benzyl. In some other embodiments, $R^2$, $R^3$ and $R^4$ are each methyl.

In some embodiments, the polymeric resin is a thermoplastic resin. In some other embodiments, the polymeric resin is a thermosetting resin. In some other embodiments, the polymeric resin is an elastomeric polymer resin.

In one embodiment, the present disclosure provides for a composite composition comprising a polymer resin and an organoclay composition. The organoclay composition comprises an organoclay composition comprising a mixture of (i) a phyllosilicate clay and quaternary ammonium ions having a formula of $[NR^1R^2R^3R^4]^+$ and (ii) a phyllosilicate clay and quaternary ammonium ions having a formula of $[NR^8R^9R^{10}R^{11}]^+$. For the organoclay composition comprising a phyllosilicate clay and quaternary ammonium ions having a formula of $[NR^1R^2R^3R^4]^+$, one or more of $R^1$, $R^2$ and $R^3$ is each a mixture of branched alkyl groups each having 12 to 22 total carbon atoms wherein the branched alkyl group has one or more $C_1$ to $C_3$ alkyl groups distributed at different carbon positions along a linear backbone of the branched alkyl group.

For the organoclay composition comprising a phyllosilicate clay and quaternary ammonium ions having a formula of $[NR^8R^9R^{10}R^{11}]^+$, one or more of $R^8$, $R^9$ and $R^{10}$ is each a third linear alkyl group having 12 to 22 total carbon atoms. In embodiments, when one or more of $R^9$ and $R^{10}$ are not the third linear alkyl group then $R^9$ and $R^{10}$ are each a fourth linear alkyl group having 1 to 22 total carbon atoms. $R^{11}$ is selected from a fifth linear alkyl group having 1 to 6 total carbon atoms, an aryl group and mixtures thereof.

In some embodiments, the polymeric resin is a thermoplastic resin. In some other embodiments, the polymeric resin is a thermosetting resin. In some other embodiments, the polymeric resin is an elastomeric polymer resin.

DETAILED DESCRIPTION OF THE EMBODIMENTS

The present invention provides for polymer-organoclay composite compositions where a phyllosilicate clay is exchanged with quaternary ammonium ions having a formula of $[NR^1R^2R^3R^4]^+$ wherein at least one of $R^1$, $R^2$ and $R^3$ is a mixture of branched alkyl groups. It has been unexpectedly found that such organoclay compositions exhibit different properties compared to prior art organoclay compositions exchanged with quaternary ammonium ions having a formula of $[NR^aR^bR^cR^d]^+$ where at least one of $R^a$, $R^b$, $R^c$ and $R^d$ is a not a mixture of branched alkyl groups but a single branched alkyl group, such as 12-methyl stearyl, having a branching point located at a single position along the linear backbone of the branched alkyl group.

In each of the embodiments, below "substantially free of quaternary carbon atoms" shall mean that a quaternary carbon atom is not detected by $C^{13}$ NMR.

Organoclay Compositions

In one embodiment, the present disclosure provides for a composite composition of a polymer and an organoclay composition. The organoclay composition comprising: a phyllosilicate clay; and quaternary ammonium ions having a formula of $[N-R^1R^2R^3R^4]^+$ wherein one or more of $R^1$, $R^2$ and $R^3$ is a mixture of branched alkyl groups, each branched alkyl group having 12 to 22 total carbon atoms, a linear backbone and one or more $C_1$ to $C_3$ branching alkyl groups, wherein the branching alkyl groups are distributed at different carbon positions along the linear backbone of the branched alkyl group; and wherein when one or more of $R^2$ and $R^3$ are not branched alkyl groups, one or more of $R^2$ and $R^3$ are a first linear alkyl group having 1 to 22 total carbon atoms. $R^4$ is selected from the group consisting of: a second linear alkyl group having 1 to 6 carbon atoms, an aryl group, and combinations thereof. In some embodiments, each branched alkyl group has 12 to 18 total carbon atoms. In some embodiments, each branched alkyl group has 14 to 18 total carbon atoms. In some embodiments, one or more of $R^2$ and $R^3$ are each a first linear alkyl group having 12 to 22 total carbon atoms; 1 to 6 total carbon atoms or 7-11 total carbon atoms. In some embodiments, $R^4$ is independently a benzyl group, a methyl group, an ethyl group, a propyl group, a butyl group, a pentyl group or a hexyl group. In some other embodiments, one or more of $R^2$ and $R^3$ are methyl and $R^4$ is benzyl. In some other embodiments, $R^2$, $R^3$ and $R^4$ are each methyl.

In some embodiments, the branched alkyl group, of one or more of $R^1$, $R^2$ and $R^3$, has an average number of branches, per branched alkyl group, of at least 0.7. In some other embodiments, the branched alkyl group, of one or more of $R^1$, $R^2$ and $R^3$, has an average number of branches per branched alkyl group ranging from 0.7 to 7. In some other embodiments, the branched alkyl group, of one or more of $R^1$, $R^2$ and $R^3$, has an average number of branches per branched alkyl group ranging from 0.7 to 5. In some other embodiments, the branched alkyl group, of one or more of $R^1$, $R^2$ and $R^3$, has an average number of branches per branched alkyl group ranging from 0.7 to 3. In each such embodiment, a methyl branch is at, least 50% of the branching alkyl groups based on the total number of branches.

In some embodiments, each branched alkyl group, of one or more of $R^1$, $R^2$ and $R^3$, has a distribution of branching points distributed along the linear backbone of the branched alkyl group ranging from a 2 carbon atom position on the linear backbone, counting from a 1 carbon atom position which is bonded to $N^+$, to a $\omega-2$ carbon atom position, where $\omega$ is a terminal carbon atom position on the linear backbone. In such embodiments, a methyl branch is at least 50% of the branching alkyl groups based on the total number of branches.

In some embodiments, the linear backbone, of the branched alkyl group of one or more of $R^1$, $R^2$ and $R^3$, contains less 0.5 atom % of quaternary carbon atoms. In other embodiments, the linear backbone, of the branched alkyl group one or more of $R^1$, $R^2$ and $R^3$, is substantially free of quaternary carbon atoms.

The organoclay composition may contain sufficient quaternary ammonium ions to satisfy 50 to 150 percent of phyllosilicate cation exchange capacity. In some embodiments, the quaternary ammonium ions are in a concentration of 90 to 140 percent of phyllosilicate cation exchange capacity wherein the positive charge of the quaternary ion, in excess of the exchange capacity, is balanced by an inorganic anion or organic anion or anionic polymer. In some embodiments, the quaternary ammonium ions are in a concentration of 95 to 130 percent of phyllosilicate cation exchange capacity wherein the positive charge of the quaternary ion, in excess of the exchange capacity, is balanced by an inorganic anion or organic anion or anionic polymer. Examples of organic anions are found in U.S. Pat. No. 5,718,841 which is incorporated by reference in its entirety herein.

In one embodiment, the present disclosure provides for a composite composition of a polymer and an organoclay composition. The organoclay composition comprising: a phyllosilicate clay; and quaternary ammonium ions having a formula of $[NR^1R^2R^3R^4]^+$ wherein $R^1$ is a mixture of branched alkyl groups, each branched alkyl group having 12 to 22 total carbon atoms, a linear backbone and one or more $C_1$ to $C_3$ branching alkyl groups, wherein the branching alkyl groups are distributed at different carbon positions along the linear backbone of the branched alkyl group; and wherein $R^2$ and $R^3$ are independently selected from the group consisting of: a first linear alkyl group having 1 to 22 total carbon atoms, wherein $R^4$ is selected from the group consisting of: a second linear alkyl group having 1 to 6 carbon atoms, an aryl group, and combinations thereof. In some embodiments, each branched alkyl group has 12 to 18 total carbon atoms. In some embodiments, each branched alkyl group has 14 to 18 total carbon atoms. In some embodiments, one or more of $R^2$ and $R^3$ are each the first linear alkyl group having 12 to 22 total carbon atoms; 1 to 6 total carbon atoms or 7-11 total carbon atoms. In some embodiments, $R^4$ is independently a benzyl group, a methyl group, an ethyl group, a propyl group, a butyl group, a pentyl group or a hexyl group. In some other embodiments, one or more of $R^2$ and $R^3$ are methyl and $R^4$ is benzyl. In some other embodiments, $R^2$, $R^3$ and $R^4$ are each methyl.

In some embodiments, the $R^1$ branched alkyl group has an average number of branches, per branched alkyl group, of at least 0.7. In some other embodiments, the $R^1$ branched alkyl group has an average number of branches per branched alkyl group ranging from 0.7 to 7. In some other embodiments, the $R^1$ branched alkyl group has an average number of branches per branched alkyl group ranging from 0.7 to 5. In some other embodiments, the $R^1$ branched alkyl group has an average number of branches per branched alkyl group ranging from 0.7 to 3. In each such embodiment, a methyl branch is at least 50% of the branching alkyl groups based on the total number of branches.

In some embodiments, the $R^1$ branched alkyl group has a distribution of branching points distributed along the linear backbone of the branched alkyl group ranging from a 2 carbon atom position on the linear backbone, counting from a 1 carbon atom position which is bonded to $N^+$, to a $\omega-2$ carbon atom position, where $\omega$ is a terminal carbon atom position on the linear backbone. In such embodiments, a methyl branch is at least 50% of the branching alkyl groups based on the total number of branches.

In some embodiments, the linear backbone, of the $R^1$ branched alkyl group, contains less 0.5 atom % of quaternary carbon atoms. In other embodiments, the linear backbone, of the $R^1$ branched alkyl group, is substantially free of quaternary carbon atoms.

The organoclay composition may contain sufficient quaternary ammonium ions to satisfy 50 to 150 percent of phyllosilicate cation exchange capacity. In some embodiments, the quaternary ammonium ions are in a concentration of 90 to 140 percent of phyllosilicate cation exchange capacity wherein the positive charge of the quaternary ion, in excess of the exchange capacity, is balanced by an inorganic anion or organic anion or anionic polymer. In some embodiments, the quaternary ammonium ions are in a concentration of 95 to 130 percent of phyllosilicate cation exchange capacity wherein the positive charge of the quaternary ion, in excess of the exchange capacity, is balanced by an inorganic anion or organic anion or anionic polymer. Examples of organic anions are found in U.S. Pat. No. 5,718,841 which is incorporated by reference in its entirety herein.

In one embodiment, the present disclosure provides for a composite composition of a polymer and an organoclay composition. The organoclay composition comprising: a phyllosilicate clay; and quaternary ammonium ions having a formula of $[NR^1R^2R^3R^4]^+$ wherein $R^1$ and $R^2$ are a mixture of branched alkyl groups, each branched alkyl group having 12 to 22 total carbon atoms, a linear backbone and one or more $C_1$ to $C_3$ branching alkyl groups, wherein the branching alkyl groups are distributed at different carbon positions along the linear backbone of the branched alkyl group; and wherein $R^3$ is a first linear alkyl group having 1 to 22 total carbon atoms, $R^4$ is selected from the group consisting of: a second linear alkyl group having 1 to 6 total carbon atoms, an aryl group, and combinations thereof. In some embodiments, each branched alkyl group has 12 to 18 total carbon atoms. In some embodiments, each branched alkyl group has 14 to 18 total carbon atoms. In some embodiments, $R^3$ is a first linear alkyl group having 12 to 22 total carbon atoms; 1 to 6 total carbon atoms or 7-11 total carbon atoms. In some embodiments, $R^4$ is independently a benzyl group, a methyl group, an ethyl group, a propyl group, a butyl group, a pentyl group or a hexyl group. In some other embodiments, $R^3$ is methyl and $R^4$ is benzyl. In some other embodiments, $R^3$ and $R^4$ are each methyl.

In some embodiments, the branched alkyl group, of $R^1$ and $R^2$, has an average number of branches, per branched alkyl group, of at least 0.7. In some other embodiments, the branched alkyl group, of $R^1$ and $R^2$, has an average number of branches per branched alkyl group ranging from 0.7 to 7. In some other embodiments, the branched alkyl group, of $R^1$ and $R^2$, has an average number of branches per branched alkyl group ranging from 0.7 to 5. In some other embodiments, the branched alkyl group, of $R^1$ and $R^2$, has an average number of branches per branched alkyl group ranging from 0.7 to 3. In each such embodiment, a methyl branch is at least 50% of the branching alkyl groups based on the total number of branches.

In some embodiments, each $R^1$ and $R^2$ branched alkyl group has a distribution of branching points distributed along the linear backbone of the branched alkyl group ranging from a 2 carbon atom position on the linear backbone, counting from a 1 carbon atom position which is bonded to $N^+$, to a $\omega-2$ carbon atom position, where $\omega$ is a terminal carbon atom position on the linear backbone. In such embodiments, a methyl branch is at least 50% of the branching alkyl groups based on the total number of branches.

In some embodiments, the linear backbone, of each $R^1$ and $R^2$ branched alkyl group, contains less 0.5 atom % of quaternary carbon atoms. In other embodiments, the linear backbone, of each $R^1$ and $R^2$ branched alkyl group, is substantially free of quaternary carbon atoms.

The organoclay composition may contain sufficient quaternary ammonium ions to satisfy 50 to 150 percent of phyllosilicate cation exchange capacity. In some embodiments, the quaternary ammonium ions are in a concentration of 90 to 140 percent of phyllosilicate cation exchange capacity wherein the positive charge of the quaternary ion, in excess of the exchange capacity, is balanced by an inorganic anion or organic anion or anionic polymer. In some embodiments, the quaternary ammonium ions are in a concentration of 95 to 130 percent of phyllosilicate cation exchange capacity wherein the positive charge of the quaternary ion, in excess of the exchange capacity, is balanced by an inorganic anion or organic anion or anionic polymer. Examples of organic anions are found in U.S. Pat. No. 5,718,841 which is incorporated by reference in its entirety herein.

In one embodiment, the present disclosure provides for a composite composition of a polymer and an organoclay composition. The organoclay composition comprising: a phyllosilicate clay; and quaternary ammonium ions having a formula of $[NR^1R^2R^3R^4]^+$, wherein $R^1$, $R^2$ and $R^3$ are each a mixture of branched alkyl groups, each branched alkyl group having 12 to 22 total carbon atoms, a linear backbone and one or more $C_1$ to $C_3$ branching alkyl groups, wherein the branching alkyl groups are distributed at different carbon positions along the linear backbone of the branched alkyl group; and wherein $R^4$ is selected from the group consisting of: a second linear alkyl group having 1 to 6 carbon atoms, an aryl group and combinations thereof. In some embodiments, each branched alkyl group has 12 to 18 carbon atoms. In some embodiments, each branched alkyl group has 14 to 18 carbon atoms. In some embodiments, $R^4$ is independently a benzyl group, a methyl group, an ethyl group, a propyl group, a butyl group, a pentyl group or a hexyl group. In some other embodiments, $R^4$ is benzyl. In some other embodiments, $R^4$ is methyl.

In some embodiments, each $R^1$, $R^2$ and $R^3$ branched alkyl group has an average number of branches, per branched alkyl group, of at least 0.7. In some other embodiments, each $R^1$, $R^2$ and $R^3$ branched alkyl group has an average number of branches per branched alkyl group ranging from 0.7 to 7. In some other embodiments, each $R^1$, $R^2$ and $R^3$ branched alkyl group has an average number of branches per branched alkyl group ranging from 0.7 to 5. In some other embodiments, each $R^1$, $R^2$ and $R^3$ branched alkyl group has an average number of branches per branched alkyl group ranging from 0.7 to 3. In each such embodiment, a methyl branch is at least 50% of the branching alkyl groups based on the total number of branches.

In some embodiments, each $R^1$, $R^2$ and $R^3$ branched alkyl group has a distribution of branching points distributed along the linear backbone of the branched alkyl group ranging from a 2 carbon atom position on the linear backbone, counting from a 1 carbon atom position which is bonded to $N^+$, to a $\omega-2$ carbon atom position, where $\omega$ is a terminal carbon atom position on the linear backbone. In such embodiments, a methyl branch is at least 50% of the branching alkyl groups based on the total number of branches.

In some embodiments, the linear backbone, of each $R^1$, $R^2$ and $R^3$ branched alkyl group, contains less 0.5 atom % of quaternary carbon atoms. In other embodiments, the linear backbone, of each $R^1$, $R^2$ and $R^3$ branched alkyl group, is substantially free of quaternary carbon atoms.

The organoclay composition may contain sufficient quaternary ammonium ions to satisfy 50 to 150 percent of phyllosilicate cation exchange capacity. In some embodiments, the quaternary ammonium ions are in a concentration of 90 to 140 percent of phyllosilicate cation exchange capacity wherein the positive charge of the quaternary ion, in excess of the exchange capacity, is balanced by an inorganic anion or organic anion or anionic polymer. In some embodiments, the quaternary ammonium ions are in a concentration of 95 to 130 percent of phyllosilicate cation exchange capacity wherein the positive charge of the quaternary ion, in excess of the exchange capacity, is balanced by an inorganic anion or organic anion or anionic polymer. Examples of organic anions are found in U.S. Pat. No. 5,718,841 which is incorporated by reference in its entirety herein.

In one embodiment, the present disclosure provides for a composite composition of a polymer and an organoclay composition. The organoclay composition comprises a mixture of (i) a phyllosilicate clay and quaternary ammonium ions having a formula of $[NR^1R^2R^3R^4]^+$ and (ii) a phyllosilicate clay and quaternary ammonium ions having a formula of $[NR^8R^9R^{10}R^{11}]^+$. For the organoclay composition comprising a phyllosilicate clay and quaternary ammonium ions having a formula of $[NR^1R^2R^3R^4]^+$, one or more of $R^1$, $R^2$ and $R^3$ is each a mixture of branched alkyl groups each having 12 to 22 total carbon atoms wherein the branched alkyl group has one or more $C_1$ to $C_3$ alkyl groups distributed at different carbon positions along a linear backbone of the branched alkyl group. In some embodiments, the branched alkyl group may have 12 to 18 total carbon atoms or 14 to 18 total carbon atoms. In embodiments, when one or more of $R^2$ and $R^3$ is not a branched alkyl group, $R^2$ and $R^3$ are each a first linear alkyl group having 1 to 22 total carbon atoms. $R^4$ is selected from the group consisting of a second linear alkyl group having 1 to 6 carbon atoms, an aryl group and combinations thereof. In some embodiments, one or more of $R^2$ and $R^3$ are each the second linear alkyl group having 12 to 22 total carbon atoms; 1 to 6 total carbon atoms or 7-11 total carbon atoms; and $R^4$ is independently a benzyl group, a methyl group, an ethyl group, a propyl group, a butyl group, a pentyl group or a hexyl group. In some other embodiments, one or more of $R^2$ and $R^3$ are methyl and $R^4$ is benzyl. In some other embodiments, $R^2$, $R^3$ and $R^4$ are each methyl.

For the organoclay composition comprising a phyllosilicate clay and quaternary ammonium ions having a formula of $[NR^8R^9R^{10}R^{11}]^+$, one or more of $R^8$, $R^9$ and $R^{10}$ is each a third linear alkyl group having 12 to 22 total carbon atoms. In embodiments, when one or more of $R^9$ and $R^{10}$ are not the third linear alkyl group then $R^9$ and $R^{10}$ are each a fourth linear alkyl group having 1 to 22 total carbon atoms. $R^{11}$ is selected from a fifth linear alkyl group having 1 to 6 total carbon atoms, an aryl group and mixtures thereof. In some embodiments, the third linear alkyl group may have 12 to 18 total carbon atoms or 14 to 18 total carbon atoms. In some embodiments, one or more of $R^9$ and $R^{10}$ are each the fourth linear alkyl group having 12 to 22 total carbon atoms; 1 to 6 total carbon atoms or 7-11 total carbon atoms. In some embodiments, $R^{11}$ is independently a benzyl group, a methyl group, an ethyl group, a propyl group, a butyl group, a pentyl group or a hexyl group. In some other embodiments, one or more of $R^9$ and $R^{10}$ are methyl and $R^{11}$ is benzyl. In some other embodiments, $R^9$, $R^{10}$ and $R^{11}$ are each methyl.

In some embodiments, each branched alkyl group, of $[NR^1R^2R^3R^4]^+$, has an average number of branches, per branched alkyl group, of at least 0.7. In some other embodiments, the branched alkyl group, of $[NR^1R^2R^3R^4]^+$, has an average number of branches, per branched alkyl group, ranging from 0.7 to 7. In some other embodiments, the branched alkyl group, of $[NR^1R^2R^3R^4]^+$, has an average number of branches, per branched alkyl group, ranging from 0.7 to 5. In some other embodiments, the branched alkyl group, of $[NR^1R^2R^3R^4]^+$, has an average number of branches, per branched alkyl group, ranging from 0.7 to 3. In each such embodiment, a methyl branch is at least 50% of the branching alkyl groups based on the total number of branches.

In some embodiments, each branched alkyl group, of $[NR^1R^2R^3R^4]^+$, has a distribution of branching points distributed along the linear backbone of the branched alkyl group ranging from a 2 carbon atom position on the linear backbone, counting from a 1 carbon atom position which is bonded to $N^+$, to a $\omega$−2 carbon atom position, where $\omega$ is a terminal carbon atom position on the linear backbone. In such embodiments, a methyl branch is at least 50% of the branching alkyl groups based on the total number of branches.

In some embodiments, the linear backbone, of each branched alkyl group of $[NR^1R^2R^3R^4]^+$, contains less 0.5 atom % of quaternary carbon atoms. In other embodiments, the linear backbone, of each branched alkyl group of $[NR^1R^2R^3R^4]^+$, is substantially free of quaternary carbon atoms.

The organoclay composition may contain sufficient quaternary ammonium ions to satisfy 50 to 150 percent of phyllosilicate cation exchange capacity. In some embodiments, the quaternary ammonium ions are in a concentration of 90 to 140 percent of phyllosilicate cation exchange capacity wherein the positive charge of the quaternary ion, in excess of the exchange capacity, is balanced by an inorganic anion or organic anion or an anionic polymer. In some embodiments, the quaternary ammonium ions are in a concentration of 95 to 130 percent of phyllosilicate cation exchange capacity wherein the positive charge of the quaternary ion, in excess of the exchange capacity, is balanced by an inorganic anion or organic anion or anionic polymer. Examples of organic anions are found in U.S. Pat. No. 5,718,841 which is incorporated by reference in its entirety herein.

In one embodiment, the present disclosure provides for a composite composition of a polymer and an organoclay composition. The organoclay composition comprises a mixture of (i) a phyllosilicate clay and quaternary ammonium ions having a formula of $[NR^1R^2R^3R^4]^+$ wherein $R^1$ is a mixture of branched alkyl groups having 12 to 22 total carbon atoms and (ii) a phyllosilicate clay and quaternary ammonium ions having a formula of $[NR^8R^9R^{10}R^{11}]^+$ wherein one or more of $R^8$, $R^9$ and $R^{10}$ is each a third linear alkyl group having 12 to 22 total carbon atoms. In some embodiments of the organoclay composition of an phyllosilicate clay and the quaternary ammonium ions having a formula of $[NR^1R^2R^3R^4]^+$, branched alkyl group of $R^1$ has one or more $C_1$ to $C_3$ alkyl groups distributed at different carbon positions along a linear backbone of the branched alkyl group. In some embodiments, the branched alkyl group, of $[NR^1R^2R^3R^4]^+$, may have 12 to 18 total carbon atoms or 14 to 18 total carbon atoms. In some embodiments, one or more of $R^2$ and $R^3$ are each a first linear alkyl group having 1 to 22 carbon atoms and $R^4$ is selected from: a second linear alkyl group having 1 to 6 total carbon atoms, an aryl group. In some embodiments, one or more of $R^2$ and $R^3$ are each the first linear alkyl group having 12 to 22 total carbon atoms, 1 to 6 total carbon atoms or 7-11 total carbon atoms. In some embodiments, $R^4$ is independently a benzyl group, a methyl group, an ethyl group, a propyl group, a butyl group, a pentyl group or a hexyl group. In some other embodiments, one or more of $R^2$ and $R^3$ are methyl and $R^4$ is benzyl. In some other embodiments, $R^2$, $R^3$ and $R^4$ are each methyl.

In some embodiments of the organoclay composition of an phyllosilicate clay and the quaternary ammonium ions having a formula of $[NR^8R^9R^{10}R^{11}]^+$, one or more of $R^9$ and $R^{10}$ are each a fourth linear alkyl group having 1 to 22 total carbon atoms. $R^{11}$ is selected from a fifth linear alkyl group having 1 to 6 total carbon atoms, an aryl group, and mixtures thereof. In some embodiments, the third linear alkyl group, of $[NR^8R^9R^{10}R^{11}]^+$, may have 12 to 18 total carbon atoms or 14 to 18 total carbon atoms. In some embodiments, one or more of $R^9$ and $R^{10}$ are each the fourth linear alkyl group having 12 to 22 total carbon atoms; 1 to 6 total carbon atoms or 7-11 total carbon atoms. In some embodiments, $R^{11}$ is independently a benzyl group, a methyl group, an ethyl group, a propyl group, a butyl group, a pentyl group or a hexyl group. In some other embodiments, one or more of $R^9$ and $R^{10}$ are methyl and $R^{11}$ is benzyl. In some other embodiments, $R^9$, $R^{10}$ and $R^{11}$ are each methyl.

In some embodiments, the $R^1$ branched alkyl group, of $[NR^1R^2R^3R^4]^+$, has an average number of branches, per branched alkyl group, of at least 0.7. In some other embodiments, the $R^1$ branched alkyl group, of $[NR^1R^2R^3R^4]^+$, has an average number of branches, per branched alkyl group, ranging from 0.7 to 7. In some other embodiments, the $R^1$ branched alkyl group, of $[NR^1R^2R^3R^4]^+$, has an average number of branches, per branched alkyl group, ranging from 0.7 to 5. In some other embodiments, the $R^1$ branched alkyl group, of $[NR^1R^2R^3R^4]^+$, has an average number of branches, per branched alkyl group, ranging from 0.7 to 3. In each such embodiment, a methyl branch is at least 50% of the branching alkyl groups based on the total number of branches.

In some embodiments, the $R^1$ branched alkyl group, of $[NR^1R^2R^3R^4]^+$, has a distribution of branching points distributed along the linear backbone of the $R^1$ branched alkyl group ranging from a 2 carbon atom position on the linear backbone, counting from a 1 carbon atom position which is bonded to $N^+$, to a $\omega$–2 carbon atom position, where $\omega$ is a terminal carbon atom position on the linear backbone. In such embodiments, a methyl branch is at least 50% of the branching alkyl groups based on the total number of branches.

In some embodiments, the linear backbone, of the $R^1$ branched alkyl group of $[NR^1R^2R^3R^4]^+$, contains less 0.5 atom % of quaternary carbon atoms. In other embodiments, the linear backbone, of the $R^1$ branched alkyl group of $[NR^1R^2R^3R^4]^+$, is substantially free of quaternary carbon atoms.

The organoclay composition may contain sufficient quaternary ammonium ions to satisfy 50 to 150 percent of phyllosilicate cation exchange capacity. In some embodiments, the quaternary ammonium ions are in a concentration of 90 to 140 percent of phyllosilicate cation exchange capacity wherein the positive charge of the quaternary ion, in excess of the exchange capacity, is balanced by an inorganic anion or organic anion or anionic polymer. In some embodiments, the quaternary ammonium ions are in a concentration of 95 to 130 percent of phyllosilicate cation exchange capacity wherein the positive charge of the quaternary ion, in excess of the exchange capacity, is balanced by an inorganic anion or organic anion or anionic polymer. Examples of organic anions are found in U.S. Pat. No. 5,718,841 which is incorporated by reference in its entirety herein.

In one embodiment, the present disclosure provides for a composite composition of a polymer and an organoclay composition. The organoclay composition comprises a mixture of (i) a phyllosilicate clay and quaternary ammonium ions having a formula of $[NR^1R^2R^3R^4]^+$ wherein $R^1$ and $R^2$ are each a mixture of branched alkyl groups having 12 to 22 total carbon atoms and (ii) a phyllosilicate clay and quaternary ammonium ions having a formula of $[NR^8R^9R^{10}R^{11}]^+$ wherein one or more of $R^8$, $R^9$ and $R^{10}$ is each a third linear alkyl group having 12 to 22 total carbon atoms. In some embodiments of the organoclay composition comprising mixture of (i) a phyllosilicate clay and quaternary ammonium ions having a formula of $[NR^1R^2R^3R^4]^+$, the branched alkyl group has one or more $C_1$ to $C_3$ alkyl groups distributed at different carbon positions along a linear backbone of the branched alkyl group. In some embodiments, the branched alkyl group may have 12 to 18 total carbon atoms or 14 to 18 total carbon atoms. $R^3$ is a first linear alkyl group having 1 to 22 total carbon atoms. $R^4$ is selected from a second linear alkyl group having 1 to 6 carbon atoms, an aryl group and mixtures thereof. In some embodiments, $R^3$ is the first linear alkyl group having 12 to 22 total carbon atoms, 1 to 6 total carbon atoms or 7-11 total carbon atoms; and $R^4$ is independently a benzyl group, a methyl group, an ethyl group, a propyl group, a butyl group, a pentyl group or a hexyl group. In some other embodiments, $R^3$ is methyl and $R^4$ is benzyl. In some other embodiments, $R^3$ and $R^4$ are each methyl.

In some embodiments of the organoclay composition comprising a phyllosilicate clay and quaternary ammonium ions having a formula of $[NR^8R^9R^{10}R^{11}]^+$, the third linear alkyl group may have 12 to 18 total carbon atoms or 14 to 18 total carbon atoms. In some embodiments, one or more of $R^9$ and $R^{10}$ are each a fourth linear alkyl group having 1 to 22 total carbon atoms. In some embodiments, one or more of $R^9$ and $R^{10}$ are each the fourth linear alkyl group having 12 to 22 total carbon atoms; 1 to 6 total carbon atoms or 7-11 total carbon atoms. In some embodiments, $R^{11}$ is selected from a fifth linear alkyl group having 1 to 6 total carbon atoms, an aryl group and combinations thereof. In some embodiments, $R^{11}$ is independently a benzyl group, a methyl group, an ethyl group, a propyl group, a butyl group, a pentyl group or a hexyl group. In some other embodiments, one or more of $R^9$ and $R^{10}$ are methyl and $R^{11}$ is benzyl. In some other embodiments, $R^9$, $R^{10}$ and $R^{11}$ are each methyl.

In some embodiments, the $R^1$ and $R^2$ branched alkyl groups, of $[NR^1R^2R^3R^4]^+$, has an average number of branches, per branched alkyl group, at least 0.7. In some other embodiments, the $R^1$ and $R^2$ branched alkyl groups, of $[NR^1R^2R^3R^4]^+$, has an average number of branches, per branched alkyl group, ranging from 0.7 to 7. In some other embodiments, the $R^1$ and $R^2$ branched alkyl groups, of $[NR^1R^2R^3R^4]^+$, has an average number of branches, per branched alkyl group, ranging from 0.7 to 5. In some other embodiments, the $R^1$ and $R^2$ branched alkyl groups, of $[NR^1R^2R^3R^4]^+$, has an average number of branches, per branched alkyl group, ranging from 0.7 to 3. In each such embodiment, a methyl branch is at least 50% of the branching alkyl groups based on the total number of branches.

In some embodiments, the $R^1$ and $R^2$ branched alkyl groups, of $[NR^1R^2R^3R^4]^+$, has a distribution of branching points distributed along the linear backbone of the $R^1$ and $R^2$ branched alkyl groups ranging from a 2 carbon atom position on the linear backbone, counting from a 1 carbon atom position which is bonded to $N^+$, to a $\omega$–2 carbon atom position, where $\omega$ is a terminal carbon atom position on the linear backbone. In such embodiments, a methyl branch is at least 50% of the branching alkyl groups based on the total number of branches.

In some embodiments, the linear backbone, of the $R^1$ and $R^2$ branched alkyl groups of $[NR^1R^2R^3R^4]^+$, contains less 0.5 atom % of quaternary carbon atoms. In other embodiments, the linear backbone, of the $R^1$ and $R^2$ branched alkyl groups of $[NR^1R^2R^3R^4]^+$, is substantially free of quaternary carbon atoms.

The organoclay composition may contain sufficient quaternary ammonium ions to satisfy 50 to 150 percent of phyllosilicate cation exchange capacity. In some embodiments, the quaternary ammonium ions are in a concentration of 90 to 140 percent of phyllosilicate cation exchange capacity wherein the positive charge of the quaternary ion, in excess of the exchange capacity, is balanced by an inorganic anion or organic anion or anionic polymer. In some embodiments, the quaternary ammonium ions are in a concentration of 95 to 130 percent of phyllosilicate cation exchange capacity wherein the positive charge of the quaternary ion, in excess of the exchange capacity, is balanced by an inorganic anion or organic anion or anionic polymer.

Examples of organic anions are found in U.S. Pat. No. 5,718,841 which is incorporated by reference in its entirety herein.

In one embodiment, the present disclosure provides for a composite composition of a polymer and an organoclay composition. The organoclay composition comprises a mixture of (i) a phyllosilicate clay and quaternary ammonium ions having a formula of $[NR^1R^2R^3R^4]^+$ wherein $R^1$, $R^2$ and $R^3$ are each a mixture of branched alkyl groups having 12 to 22 total carbon atoms and $R^4$ is a second linear alkyl group having 1 to 6 carbon total atoms, an aryl and mixtures thereof and (ii) a phyllosilicate clay and quaternary ammonium ions having a formula of $[NR^8R^9R^{10}R^{11}]^+$ wherein one or more of $R^8$, $R^9$ and $R^{10}$ is each a third linear alkyl group having 12 to 22 total carbon atoms. In some embodiments, one or more of $R^9$ and $R^{10}$ are each a fourth linear alkyl group having 1 to 22 total carbon atoms, $R^{11}$ is selected from a fifth linear alkyl group having 1 to 6 total carbon atoms, an aryl and mixtures thereof. In some embodiments, the branched alkyl group has one or more $C_1$ to $C_3$ alkyl groups distributed at different carbon positions along a linear backbone of the branched alkyl group. In some embodiments, the branched alkyl group may have 12 to 18 total carbon atoms or 14 to 18 total carbon atoms. In some embodiments, the third linear alkyl group may have 12 to 18 total carbon atoms or 14 to 18 total carbon atoms. In some embodiments, $R^4$ is independently a benzyl group, a methyl group, an ethyl group, a propyl group, a butyl group, a pentyl group or a hexyl group. In some other embodiments, $R^4$ is benzyl. In some other embodiments, $R^4$ is each methyl. In some embodiments, one or more of $R^9$ and $R^{10}$ are each the third linear alkyl group having 12 to 22 total carbon atoms; 1 to 6 total carbon atoms or 7-11 total carbon atoms and $R^{11}$ is independently a benzyl group, a methyl group, an ethyl group, a propyl group, a butyl group, a pentyl group or a hexyl group. In some other embodiments, one or more of $R^9$ and $R^{10}$ are methyl and $R^{11}$ is benzyl. In some other embodiments, $R^9$, $R^{10}$ and $R^{11}$ are each methyl.

In some embodiments, the $R^1$, $R^2$ and $R^3$ branched alkyl groups, of $[NR^1R^2R^3R^4]^+$, has an average number of branches, per branched alkyl group, at least 0.7. In some other embodiments, the $R^1$, $R^2$ and $R^3$ branched alkyl groups, of $[NR^1R^2R^3R^4]^+$, has an average number of branches, per branched alkyl group, ranging from 0.7 to 7. In some other embodiments, the $R^1$, $R^2$ and $R^3$ branched alkyl groups, of $[NR^1R^2R^3R^4]^+$, has an average number of branches, per branched alkyl group, ranging from 0.7 to 5. In some other embodiments, the $R^1$, $R^2$ and $R^3$ branched alkyl groups, of $[NR^1R^2R^3R^4]^+$, has an average number of branches, per branched alkyl group, ranging from 0.7 to 3. In each such embodiment, a methyl branch is at least 50% of the branching alkyl groups based on the total number of branches.

In some embodiments, the $R^1$, $R^2$ and $R^3$ branched alkyl groups, of $[NR^1R^2R^3R^4]^+$, has a distribution of branching points distributed along the linear backbone of the $R^1$, $R^2$ and $R^3$ branched alkyl groups ranging from a 2 carbon atom position on the linear backbone, counting from a 1 carbon atom position which is bonded to $N^+$, to a $\omega-2$ carbon atom position, where $\omega$ is a terminal carbon atom position on the linear backbone. In such embodiments, a methyl branch is at least 50% of the branching alkyl groups based on the total number of branches.

In some embodiments, the linear backbone, of the $R^1$, $R^2$ and $R^3$ branched alkyl groups of $[NR^1R^2R^3R^4]^+$, contains less 0.5 atom % of quaternary carbon atoms. In other embodiments, the linear backbone, of the $R^1$, $R^2$ and $R^3$ branched alkyl groups of $[NR^1R^2R^3R^4]^+$, is substantially free of quaternary carbon atoms.

The organoclay composition may contain sufficient quaternary ammonium ions to satisfy 50 to 150 percent of phyllosilicate cation exchange capacity. In some embodiments, the quaternary ammonium ions are in a concentration of 90 to 140 percent of phyllosilicate cation exchange capacity wherein the positive charge of the quaternary ion, in excess of the exchange capacity, is balanced by an inorganic anion or organic anion or anionic polymer. In some embodiments, the quaternary ammonium ions are in a concentration of 95 to 130 percent of phyllosilicate cation exchange capacity wherein the positive charge of the quaternary ion, in excess of the exchange capacity, is balanced by an inorganic anion or organic anion or anionic polymer. Examples of organic anions are found in U.S. Pat. No. 5,718,841 which is incorporated by reference in its entirety herein.

In one embodiment, the present disclosure provides for a composite composition of a polymer and an organoclay composition. The organoclay composition comprises a phyllosilicate clay and a mixture of quaternary ammonium ions having formulas of (i) $[NR^1R^2R^3R^4]^+$ wherein one or more of $R^1$, $R^2$ and $R^3$ is each a mixture of branched alkyl groups each having 12 to 22 total carbon atoms; 12 to 18 total carbon atoms or 14 to 18 total carbon atoms and (ii) $[NR^8R^9R^{10}R^{11}]^+$ wherein one or more of $R^8$, $R^9$ and $R^{10}$ is each a third linear alkyl group having 12 to 22 total carbon atoms; 12 to 18 total carbon atoms or 14 to 18 total carbon atoms. In some embodiments, the branched alkyl group has one or more $C_1$ to $C_3$ alkyl groups distributed at different carbon positions along a linear backbone of the branched alkyl group.

In some embodiments of quaternary ammonium ion having formula of (i) $[NR^1R^2R^3R^4]^+$, when one or more of $R^2$ and $R^3$ are not branched alkyl groups, one or more of $R^2$ and $R^3$ are each a first linear alkyl group having 1 to 22 carbon total atoms. $R^4$ is independently selected from a second linear alkyl group having 1 to 22 total carbon atoms, an aryl group and mixtures thereof. In some embodiments, one or more of $R^2$ and $R^3$ are each the first linear alkyl group having 12 to 22 total carbon atoms; 1 to 6 total carbon atoms or 7-11 total carbon atoms; and $R^4$ is independently a benzyl group, a methyl group, an ethyl group, a propyl group, a butyl group, a pentyl group or a hexyl group. In some other embodiments, one or more of $R^2$ and $R^3$ are methyl and $R^4$ is benzyl. In some other embodiments, $R^2$, $R^3$ and $R^4$ are each methyl.

In some embodiments of the quaternary ammonium ion having formula of $[NR^8R^9R^{10}R^{11}]^+$ wherein, $R^8$ is the third linear alkyl group and $R^9$ and $R^{10}$ are each a fourth linear alkyl group having 1 to 22 total carbon atoms, and $R^{11}$ is selected from a fifth linear alkyl group having 1 to 6 total carbon atoms, an aryl group and mixtures thereof. The fourth linear alkyl group may have 12 to 22 total carbon atoms; 1 to 6 total carbon atoms or 7-11 total carbon atoms. $R^{11}$ is independently a benzyl group, a methyl group, an ethyl group, a propyl group, a butyl group, a pentyl group or a hexyl group. In some other embodiments, one or more of $R^9$ and $R^{10}$ are methyl and $R^{11}$ is benzyl. In some other embodiments, $R^9$, $R^{10}$ and $R^{11}$ are each methyl.

In some embodiments of the quaternary ammonium ion having formula of $[NR^8R^9R^{10}R^{11}]^+$, $R^8$ and $R^9$ are the third linear alkyl group and $R^{10}$ is a fourth linear alkyl group having 1 to 22 total carbon atoms, and $R^{11}$ is selected from a fifth linear alkyl group having 1 to 6 total carbon atoms, an aryl group and mixtures thereof. The fourth linear alkyl group may have 12 to 22 total carbon atoms; 1 to 6 total carbon atoms or 7-11 total carbon atoms. $R^{11}$ is independently a benzyl group, a methyl group, an ethyl group, a propyl group, a butyl group, a pentyl group or a hexyl group. In some other embodiments, one or more of $R^9$ and $R^{10}$ are methyl and $R^{11}$ is benzyl. In some other embodiments, $R^9$, $R^{10}$ and $R^{11}$ are each methyl.

In some embodiments of the quaternary ammonium ion having formula of $[NR^8R^9R^{10}R^{11}]^+$, $R^8$, $R^9$ and $R^{10}$ are the third linear alkyl group and $R^{11}$ is selected from a fifth linear alkyl group having 1 to 6 total carbon atoms, an aryl group and mixtures thereof. $R^{11}$ is independently a benzyl group, a methyl group, an ethyl group, a propyl group, a butyl group, a pentyl group or a hexyl group. In some other embodiments, one or more of $R^9$ and $R^{10}$ are methyl and $R^{11}$ is benzyl. In some other embodiments, $R^9$, $R^{10}$ and $R^{11}$ are each methyl.

In some embodiments, each branched alkyl group, of $[NR^1R^2R^3R^4]^+$, has an average number of branches, per branched alkyl group, of at least 0.7. In some other embodiments, the branched alkyl group, of $[NR^1R^2R^3R^4]^+$, has an average number of branches, per branched alkyl group, ranging from 0.7 to 7. In some other embodiments, the branched alkyl group, of $[NR^1R^2R^3R^4]^+$, has an average number of branches, per branched alkyl group, ranging from 0.7 to 5. In some other embodiments, the branched alkyl group, of $[NR^1R^2R^3R^4]^+$, has an average number of branches, per branched alkyl group, ranging from 0.7 to 3. In each such embodiment, a methyl branch is at least 50% of the branching alkyl groups based on the total number of branches.

In some embodiments, each branched alkyl group, of $[NR^1R^2R^3R^4]^+$, has a distribution of branching points distributed along the linear backbone of the branched alkyl group ranging from a 2 carbon atom position on the linear backbone, counting from a 1 carbon atom position which is bonded to $N^+$, to a $\omega-2$ carbon atom position, where $\omega$ is a terminal carbon atom position on the linear backbone. In such embodiments, a methyl branch is at least 50% of the branching alkyl groups based on the total number of branches.

In some embodiments, the linear backbone, of each branched alkyl group of $[NR^1R^2R^3R^4]^+$, contains less 0.5 atom % of quaternary carbon atoms. In other embodiments, the linear backbone, of each branched alkyl group of $[NR^1R^2R^3R^4]^+$, is substantially free of quaternary carbon atoms.

The organoclay composition may contain sufficient quaternary ammonium ions to satisfy 50 to 150 percent of phyllosilicate cation exchange capacity. In some embodiments, the quaternary ammonium ions are in a concentration of 90 to 140 percent of phyllosilicate cation exchange capacity wherein the positive charge of the quaternary ion, in excess of the exchange capacity, is balanced by an inorganic anion or organic anion or an anionic polymer. In some embodiments, the quaternary ammonium ions are in a concentration of 95 to 130 percent of phyllosilicate cation exchange capacity wherein the positive charge of the quaternary ion, in excess of the exchange capacity, is balanced by an inorganic anion or organic anion or anionic polymer. Examples of organic anions are found in U.S. Pat. No. 5,718,841 which is incorporated by reference in its entirety herein.

Preparation of Quaternary Ammonium Ions

Quaternary ammonium ions are obtained when fatty amines are quaternized with alkylating agents such as methyl chloride, benzyl chloride and the like. Note that the fatty amines may contain one or more of alkyl chains per amine group. Various commercial processes have been developed to produce fatty (long alkyl chain) amines. Fatty acids can be readily converted into fatty amines using a nitrile path as outlined in U.S. Pat. No. 5,634,969 for instance. Fatty amines may also be prepared by reacting fatty alcohol with aminating agents as disclosed in, for instance, U.S. Pat. No. 4,683,336 or U.S. Pat. No. 4,994,620. Alternatively, long alkyl chain internal- and/or terminal-olefins can be converted into fatty amines via hydrobromination and reaction with aminating agents as disclosed in U.S. Pat. No. 4,024,189 or U.S. Pat. No. 7,342,136. Said olefins can be obtained through oligomerization of shorter olefins or by cracking larger paraffin wax type molecules.

Fatty alkyl chains can be derived from a variety of natural oleo-chemical sources. These sources can be used to supply raw materials for either the nitrile or alcohol routes that yield fatty amines. Palm or tallow fatty acids are popular raw materials for organoclay manufacture because of cost and availability. The majority of fatty acids that are derived from animal or plant sources are linear. Fatty acids can be converted to fatty alcohols which then are used in the fatty alcohol route to make fatty amines.

Saturated branched chain fatty acids can also be obtained from natural fatty acids. Isostearic acid is a byproduct in the dimer acid production but yields are relatively low making such materials expensive. Recently, significant advances have been made to isomerize natural feed stocks so that linear alkyl chains can be converted into branched alkyl chains, U.S. Pat. No. 5,677,473. Technology described in US 2011/0263884 discloses a high yield skeletal isomerization process of unsaturated linear fatty acids such as oleic acid. The process is highly selective and cost effective (Ind. Eng. Chem. Res. 2012, 51, 12041-12045). Isostearic acid typically is an isomeric mixture where the branching occurs at various positions along the chain. Isostearic acids are commercially available under the Century, Emersol, Emery, Oxocol and Prisorine brand names.

Petrochemical processes have been developed that convert natural gas or olefins such as ethylene, propylene and the like, into fatty alkyl chains to prepare products such as, for example, fatty alcohols. Cracking of paraffin can also yield long chain olefins that can be converted into fatty alcohols via a hydroformylation process. The performance of petrochemical based linear primary alcohols and derivatives are in many applications comparable to oleo-based alcohol products because the chemical composition is essentially the same. However, the various petrochemical processes can also yield chains with a certain degree of branching. Ziegler, Fisher-Tropsch, Oxo and Querbet alcohols all contain varying degrees of branched alkyl chains. Typical long chain petrochemical alcohols that are commercially available are NEODOL (Shell), EXXAL (Exxon) and ALFOL, SAFOL, MARLIPAL, ISALCHEM, ALCHEM and LIAL (Sasol) alcohols. U.S. Pat. Nos. 5,849,960, 6,150, 322, 7,781,390 and references therein describe processes and compositions of linear as well as branched petrochemical alcohols. The skeletal isomerization of long chain olefins into branched olefins followed by selective hydroformylation yield branched alcohols such as NEODOL 67, which is a highly branched alcohol (Handbook of Detergents, Part F: Production). Hence, alkyl branching can occur at any location around the alkyl chain, and the branching group can be methyl, ethyl or even longer alkyl groups. The average number of branching per alkyl chain can be determined with $^1H$ and $^{13}C$ NMR analysis, while alkyl chain length distribution can be estimated with GC. An average branching per alkyl chain above unity means that some alkyl chains have more than one branch per alkyl chain.

Phyllosilicate Clays

Phyllosilicate clay includes natural or synthetic phyllosilicate clay, or mixtures thereof, which undergo ion exchange reactions with quaternary ammonium cations forming an organoclay. Representative natural phyllosilicate clays include smectites, palygorskite, sepiolite, vermiculites, and micas. Examples of smectite-type clays include montmorillonite, bentonite, hectorite, saponite, stevensite, and beidellite. In some embodiments, the phyllosilicate clay includes swelling clays such as hectorite and Wyoming-type bentonite. In some embodiments, the phyllosilicate clay is a mixture of hectorite and bentonite. Bentonite and its properties are described at length in the chapter entitled "Bentonite," in Carr, D., ed. 1994, Industrial Minerals and Rocks, 6th Edition (published by the Society For Mining, Metallurgy and Exploration, Colorado). Smectite-type clays are well known in the art and are commercially available from a variety of sources. Phyllosilicate clays useful in accordance with the present invention are described in detail in "Hydrous Phyllosilicates, Reviews in Mineralogy, Volume 19, S. W. Bailey, editor." Other useful literature can be found in Elsevier book series entitled "Developments in Clay Science", in particular Volume 5 entitled "Handbook of Clay Science."

Smectite clays which are layered, platy, hydrophilic silicate materials. In the dry state, several nano-sized clay layers are normally stacked on top of each other and these stacks, or tactoids, are agglomerated into particles. However, the platelets spontaneously separate from each other when dry clay powder is dispersed in water. This "delamination of layers" is at times also referred to as "exfoliation of layers." Smectite clay layers carry a net negative charge on the platelets that is neutralized by metal cations that are positioned on the surfaces of the platelets. An organoclay is formed when the metal cations are exchanged with organic cations. This reaction may be partially completed or driven to completion. Organic surface treatment is often necessary to improve the compatibility of the clay with organic systems. Similar to "pristine" inorganic clays in water, organoclays can delaminate in organic systems (solvents, polymers): i.e. the clay layers that are now decorated with organic cations are separated from each other when they are exfoliated in said systems.

In an embodiment, the phyllosilicate clay may include crude clay or beneficiated clay. The crude clay contains gangue or non-clay material whereas the gangue material has been largely removed from the beneficiated clay. In an embodiment using crude clay, substantial cost savings may be realized because the steps for the clay beneficiation process and conversion to the sodium form are eliminated.

In some embodiments, the phyllosilicate clays include synthetic phyllosilicate clays including synthetic vermiculite, synthetic smectite, synthetic hectorite, synthetic fluorohectorite and synthetic mica. The performance of synthetic clay based organoclays may differ, either positively or negatively, from those based on naturally occurring clays. These differences may be due to chemical composition and homogeneity thereof, ion exchange capacity, location of the ion exchange sites, impurities, surface area, platelet size and distribution, and or other reasons. These clays, also, may optionally be purified if desired.

The exchangeable inorganic cations of the phyllosilicate clay may be sodium or another cation. Preferably the exchangeable cations will be sodium. In some embodiments, the exchangeable cations can be a mixture of sodium, magnesium and calcium. In one embodiment, the sodium form of the smectite clay may be used. To prepare the sodium form of one embodiment, bentonite clay may be converted to the sodium form by preparing an aqueous clay slurry and passing the slurry through a bed of cation exchange resin in the sodium form. In another embodiment, the sodium form of the smectite clay may be prepared by mixing the clay with water and a soluble sodium compound, such as sodium carbonate, sodium hydroxide, etc.

In an embodiment, the phyllosilicate clay includes smectite-type clay having a cation exchange capacity of at least 45 mMols per 100 grams of clay, 100% active clay basis, as determined by the well-known ammonium acetate method or equivalent method. In another embodiment, the phyllosilicate clay includes smectite-type clay having a cation exchange capacity of at least 75 mMols per 100 grams of clay, 100% active clay basis.

The clay may be either sheared or non-sheared forms of the above-listed smectite clays. In one embodiment, the sheared form of the smectite clay may provide improved performance as compared to non-sheared clay material. Elementis Specialties, Inc. and its predecessor have issued patents describing the shearing of smectite clay, as described in U.S. Pat. No. 4,695,402 and U.S. Pat. No. 4,742,098 which are incorporated herein by reference in their entirety.

Polymeric Resin

The organoclay compositions, described herein, may be combined with various polymeric resins to form a composite composition.

In some embodiments, the polymeric resin is a thermoplastic resin. In such embodiments, the thermoplastic resin comprises polyolefin, polyurethane, polyamide, fluoropolymer, polyimide, polycarbonate, polyester, polysulfone, polylactone, polyacetal, acrylonitrile copolymer, polyphenylene oxide, polyphenylene sulfide, polystyrene, aromatic polyketone, or a combination thereof.

In some embodiments, the polymeric resin is a thermosetting resin. In such embodiments, the thermosetting resin comprises epoxy resins, alkyd resins, acrylic resins, one-part and two-part urethane resins, cyanate resins, phenolic resins, aminoplast resins, and combinations thereof.

In some embodiments, the polymeric resin is an elastomeric polymer resin. In such embodiments, the elastomeric resin comprises polybutadiene, polyisobutylene, ethylene-propylene copolymers, ethylene-propylene-diene terpolymers, sulfonated ethylene-propylene-diene terpolymers, polychloroprene, poly(2,3-dimethylbutadiene), poly(butadiene-co-pentadiene), chlorosulfonated polyethylenes, polysulfide elastomers, silicone elastomers, poly(butadiene-co-nitrile), hydrogenated nitrile-butadiene copolymers, acrylic elastomers, ethylene-acrylate copolymers.

In some embodiments, the organoclays comprise a total of at least 1 wt %, more at least 10 wt %, and at least 30 wt % of the polymer organoclay composite based on total weight of the polymer organoclay composite. In some embodiments, the organoclay comprise 0.1 wt. % to 10 wt. %, 0.5 wt. % to 7 wt. % or 1 wt. % to 5 wt. % of the polymer organoclay composite based on total weight of the polymer organoclay composite.

EXAMPLES

The following examples further describe and demonstrate illustrative embodiments within the scope of the present invention. The examples are given solely for illustration and are not to be construed as limitations of this invention as many variations are possible without departing from the spirit and scope thereof.

Quaternary ammonium compounds bearing branched alkyl groups may be made with any known process. Non limiting synthesis examples to prepare such branched quaternary ammonium compounds are given below starting with branched alcohols as branched alkyl source or branched fatty acids as the branched alkyl source.

Example 1

A. Synthesis of Benzyl Dimethyl (Branched Alkyl) Quaternary Ammonium Chloride Step 1: Synthesis of a (Branched Alkyl) Bromide from a (Branched Alkyl) Alcohol In a 1 L, three-necked flask, fitted with a mechanical stirrer, a thermometer, and a dropping funnel, is placed 113 g of Neodol 67 alcohol. The alcohol is cooled to 0° C. by immersing the flask in an ice bath, and 55 g of phosphorus tribromide is slowly added with stirring at such a rate as to keep the temperature at 0° C. (about two hours). The cooling bath is removed, and stirring is continued until the mixture reaches room temperature; it is then allowed to stand overnight.

To the flask was added 200 ml diethyl ether and 200 ml deionized water. The pH of the mixture was adjusted to neutral with 5% potassium hydroxide under ice bath cooling. Subsequently the solution was transferred to a reparatory funnel, the bottom layer was drained and the top layer was washed with brine solution three times. The top layer was then collected and filtered to remove white precipitate; about 105 g of branched alkyl bromide was thus collected after diethyl ether was removed by rota-evaporation.

Neodol 67 (Shell) mainly is a mixture of C16 and C17 branched primary alcohols and is produced through selective hydroformylation of branched olefins, which are derived from ethylene. The hydrocarbon backbone of Neodol 67 is linear with one or more methyl branching groups directly bonded to the backbone. These methyl branches are distributed along the backbone.

Step 2: Synthesis of a Dimethyl (Branched Alkyl) Tertiary Amine

A total of 30.7 g of branched alkyl bromide (from Step 1) was added to 147 ml of dimethylamine ethanolic solution. The mixture is stirred at room temperature for 24 h, then a 10% aqueous solution of sodium hydroxide is added and the mixture is extracted three times with diethyl ether. The organic layers were washed, dried and then concentrated.

Step 3: Synthesis of Benzyl Dimethyl (Branched Alkyl) Quaternary Ammonium Chloride A four-neck, 250 mL round-bottom flask equipped with a reflux condenser, thermocouple and 2 glass stoppers is charged with 20 g of dimethyl (branched alkyl) tertiary amine (from Step 2), 5.8 g of benzyl chloride and roughly 100 mL isopropyl alcohol. Next, 3.5 g of sodium bicarbonate was added to the mixture under stirring and the flask was kept at 75° C. for 48 hours. Then the reaction mixture was filtered hot over a Buchner funnel equipped with filter paper to remove solid sodium bicarbonate. Ethanol was removed by rota-evaporation, and the residue was dissolved in 100 ml of diethyl ether and extracted with three portions of 100 ml deionized water, all aqueous extracts were then combined and water was removed by rota-evaporation.

B. Organoclay Preparation

A sodium bentonite clay ore from Wyoming was dispersed in water at about 5 wt. % clay solids. The crude clay slurry was mixed overnight at ambient temperature and then centrifuged to yield a beneficiated clay slurry. Roughly 30 wt % of the crude bentonite clay was discarded during the beneficiation process, and the resulting purified clay slurry was ion exchanged into the sodium form prior to shearing with a Manton Gaulin homogenizer. The beneficiated and sheared clay had a cation exchange capacity of about 102 milliequivalents (meq.) per 100 grams clay as determined by the methylene blue method. The clay slurry was diluted with water to yield 2% clay solids at reaction and then heated to 65° C. prior to reaction with a certain cation exchange equivalent of benzyl dimethyl (branched alkyl) quaternary ammonium chloride, per 100 grams of clay (dry basis). After reaction, the organoclay was filtered, dried in a forced air oven set at 45° C. and milled to a fine powder. The sample was labeled 3383-11-2.

Example 2

A. Synthesis of Dimethyl Di(Branched Alkyl) Quaternary Ammonium Bromide

Using a branched petrochemical alcohol as the starting material, a (branched alkyl) bromide and dimethyl (branched alkyl) tertiary amine were prepared as described in steps 1 and 2 of Example 1A.

A four-neck, 250 mL round-bottom flask equipped with a reflux condenser, thermocouple and 2 glass stoppers is charged with 25 g of dimethyl (branched alkyl) tertiary amine, 15.2 g of (branched alkyl) bromide and about 100 mL isopropyl alcohol. Next, 4.4 g of sodium bicarbonate was added to the mixture under stirring and the flask was kept at 75° C. for 120 hours or longer until the amine value is below one. Then the reaction mixture was filtered hot over a Büchner funnel equipped with filter paper to remove solid sodium bicarbonate. Isopropyl alcohol was removed by rota-evaporation. Purity of the final product was confirmed with $^1$H NMR.

B. Organoclay Preparation

An organoclay was prepared according to the procedure of Example 1B using dimethyl di(branched alkyl) quaternary ammonium bromide as the quaternary ammonium compound. The organoclay sample was labeled 3279-36-1.

Example 3

A. Synthesis of Dimethyl Di(Branched Alkyl) Quaternary Ammonium Bromide

A dimethyl di(branched alkyl) quaternary ammonium bromide compound was prepared as described in Example 1A where the branched alkyl group was derived from a branched fatty acid compound.

Step 1: Prisorene 3515 (Croda) isostearyl alcohol was used in the synthesis of a branched alkyl bromide in a similar manner as described in Example 1, Step A1. Prisorene 3515 is a fully hydrogenated alcohol and is derived from isostearic acid, which is a branched-chain fatty acid derived from vegetable oils or animal fats. Isosteraric acid is not a single molecule, but a rich isomeric mixture in which the branching occurs at different positions along the alkyl chain. The branching is short, mostly methylenic and multiple branching also occurs in small amounts.

Step 2: Synthesis of a Dimethyl (Branched Alkyl) Tertiary Amine

The branched alkyl bromide, derived from isostearyl alcohol, was mixed with dimethylamine ethanolic solution. The mixture is stirred at room temperature for 24 h, then a 10% aqueous solution of sodium hydroxide is added and the mixture is extracted three times with diethyl ether. The organic layers were washed, dried and then concentrated.

Step 3: Synthesis of Dimethyl Di(Branched Alkyl) Quaternary Ammonium Bromide

The procedure of Example 2 was followed using the branched alkyl bromide and dimethyl (branched alkyl) tertiary amine each derived from isostearyl alcohol.

B. Organoclay Preparation

An organoclay was prepared according to Example 1B, using a cation exchange equivalent of a dimethyl di(branched alkyl) quaternary ammonium bromide compound where the branched alkyl groups were obtained from an isostearyl alcohol. The sample was labeled sample was labeled 3279-22-2.

Comparative Example 1

Following the procedure of Example 1B, a control organoclay was prepared using a commercially available benzyl dimethyl hydrogenated tallow quaternary ammonium chloride and this sample was labeled as 3383-11-1.

Comparative Example 2

Following the procedure of Example 1B, a control organoclay was prepared with commercially available dimethyl dihydrogenated tallow ammonium chloride and this sample was labeled 3279-22-1.

Example 4

The effect of temperature on the viscosity of a 100% solids epoxy coating was examined. The formulation of Table 1 was prepared.

TABLE 1

| Description: 800 g batch; 70 mm blade heavy duty; 1 L stainless steel jacketed mixing pot Formula & Procedure | |
|---|---|
| 1) Set water bath to 150° F./65° C. Add the following materials (+/−0.1 g). | 800 g |
| Epon 828 | 238.37 |
| Erysys GE-8 | 37.35 |
| Organoclay additive | 10.36 |
| Methanol/Water (95/5) Polar activator | 3.31 |
| 2) Add while mixing @ 300-700 rpm. | |
| TI Pure R-900 | 76.15 |
| Nicron 503 | 34.47 |
| Minex 4 | 34.47 |

TABLE 1-continued

| Description: 800 g batch; 70 mm blade heavy duty; 1 L stainless steel jacketed mixing pot Formula & Procedure | |
|---|---|
| Heucophos ZPA (Heubach) | 5.60 |
| Wolastocoat 10 ES | 121.65 |
| Cimbar UF (Barytes) | 139.47 |
| 3) Add the following Let Down ingredients to mix pot (+/−0.1 g) | |
| Epon 828 | 96.94 |
| Tint-Ayd HS 20317 | 1.87 |
| 4) Mix 10 min at 1000 rpm at 120° F. while covered. | |
| Total | 800.00 |
| Part B: Lite 2001LV Amine (AHEW 132) | |
| 100 Part A: 28.25 Part B | |

The viscosity of the Part A system was measured at 72° F. and at 40° F. The sag of the Part A+Part B expoxy coating was then measured. The results are shown in Table 20.

TABLE 20

| | Part "A" Brookfield viscosity, cp measured at 72° F. | Part "A" Brookfield viscosity, cp measured at 40° F. | PART "A" + PART "B" SAG, mils |
|---|---|---|---|
| Blank | 26800 | 164000 | 10 |
| Comparative example 1 | 48400 | 362000 | 18 |
| Example 1 | 49600 | 238000 | 19 |

The data in Table 20 demonstrates that for the Part A system, addition of the inventive organoclay of example 1 and the organoclay of comparative example 1 results in an increased viscosity and a thicker coating for the Part A+B system compared to Part A and Part A+B in the absence of organoclay. Comparison of the Part A system at 72° F. versus 40° F. shows that the inventive organoclay, example 1, increases the viscosity but advantageously not to the degree as the organoclay of comparative example 1.

The present disclosure may be embodied in other specific forms without departing from the spirit or essential attributes of the invention. Accordingly, reference should be made to the appended claims, rather than the foregoing specification, as indicating the scope of the disclosure. Although the foregoing description is directed to the preferred embodiments of the disclosure, it is noted that other variations and modification will be apparent to those skilled in the art, and may be made without departing from the spirit or scope of the disclosure.

What is claimed:

1. A composite composition comprising:
a polymeric resin; and
organoclay composition comprising:
a phyllosilicate clay; and
a mixture of quaternary ammonium ions, each ion having a formula of $[N-R^1R^2R^3R^4]^+$ wherein within such mixture of quaternary ammonium ions, one or more of $R^1$, $R^2$ and $R^3$ is each a mixture of branched alkyl groups; each branched alkyl group has 12 to 22 total carbon atoms, a linear backbone and one or more $C_1$ to $C_3$ branching alkyl groups each being linked to the linear backbone at a branching carbon position, and within each quaternary ammonium ion and within the mixture of branched alkyl groups the $C_1$ to $C_3$ branching alkyl groups are linked to the linear backbones at various branching carbon positions as a distribution; and wherein when one or more of $R^2$ and $R^3$ is not a branched alkyl group, one or more of $R^2$ and $R^3$ are a first linear alkyl group having 1 to 22 carbon atoms, wherein $R^4$ is selected from the group consisting of a second linear alkyl group having 1 to 6 carbon atoms, an aryl group and combinations thereof.

2. The composite composition according to claim 1, wherein $R^1$ is a mixture of branched alkyl groups.

3. The composite composition according to claim 1, wherein $R^1$ and $R^2$ are each a mixture of branched alkyl groups.

4. The composite composition according to claim 1, wherein $R^1$, $R^2$ and $R^3$ are each a mixture of branched alkyl groups.

5. The composite composition according to claim 1, wherein one or more of $R^2$ and $R^3$ are each the first linear alkyl group having 1 to 22 total carbon atoms.

6. The composite composition according to claim 5, wherein one or more of $R^2$ and $R^3$ are each the first linear alkyl group having 12 to 22 total carbon atoms.

7. The composite composition according to claim 5, wherein one or more of $R^2$ and $R^3$ are each the first linear alkyl group having 1 to 6 total carbon atoms.

8. The composite composition according to claim 1, wherein $R^4$ is independently selected from the group consisting of a benzyl group, a methyl group, an ethyl group, a propyl group, a butyl group, a pentyl group or a hexyl group.

9. The composite composition according to claim 1, wherein one of $R^2$, $R^3$ and $R^4$ is methyl.

10. The composite composition according to claim 1, wherein $R^2$ and $R^3$ are methyl and $R^4$ is benzyl.

11. The composite composition according to claim 1, wherein each branched alkyl group has a distribution of branching points distributed along the linear backbone of the branched alkyl group ranging from a 2 carbon atom position on the linear backbone, counting from a 1 carbon atom position which is bonded to $N^+$, to a ω−2 carbon atom position, where ω is a terminal carbon atom position on the linear backbone.

12. The composite composition according to claim 1, wherein each branched alkyl group has 12 to 18 carbon atoms.

13. The composite composition according to claim 1, wherein each branched alkyl group has 14 to 18 carbon atoms.

14. The composite composition according to claim 1, wherein the linear backbone is substantially free of quaternary carbon atoms.

15. The composite composition according to claim 1, wherein a methyl branch is at least 50% of the branching alkyl groups based on the total number of branches.

16. The composite composition according to claim 1, wherein the phyllosilicate clay comprises a smectite clay.

17. The composite composition of claim 16, wherein said smectite clay is selected from the group consisting of montmorillonite, bentonite, hectorite, saponite, stevensite and beidellite.

18. The composite composition of claim 16, wherein said smectite clay is selected from bentonite and hectorite, and mixtures thereof.

19. The composite composition of claim 1, wherein having sufficient quaternary ammonium ions to satisfy 50 to 150 percent of phyllosilicate cation exchange capacity.

20. The composite composition according to claim 1, wherein the polymeric resin is a thermoplastic resin.

21. The composite composition according to claim 20, wherein the thermoplastic resin comprises polyolefin, polyurethane, polyamide, fluoropolymer, polyimide, polycarbonate, polyester, polysulfone, polylactone, polyacetal, acrylonitrile copolymer, polyphenylene oxide, polyphenylene sulfide, polystyrene, aromatic polyketone, or a combination thereof.

22. The composite composition according to claim 1, wherein the polymeric resin is a thermosetting resin.

23. The composite composition according to claim 22, wherein the thermosetting resin comprises epoxy resins, alkyd resins, acrylic resins, one-part and two-part urethane resins, cyanate resins, phenolic resins, aminoplast resins, or combinations thereof.

24. The composite composition according to claim 1, wherein the polymeric resin is an elastomeric polymer resin.

25. The composite composition according to claim 24, wherein the elastomeric resin comprises polybutadiene, polyisobutylene, ethylene-propylene copolymers, ethylene-propylene-diene terpolymers, sulfonated ethylene-propylene-diene terpolymers, polychloroprene, poly(2,3-dimethylbutadiene), poly(butadiene-co-pentadiene), chlorosulfonated polyethylenes, polysulfide elastomers, silicone elastomers, poly(butadiene-co-nitrile), hydrogenated nitrile-butadiene copolymers, acrylic elastomers, or ethylene-acrylate copolymers.

26. A composite composition comprising:
a polymeric resin; and
organoclay composition comprising:
a phyllosilicate clay; and
a mixture of quaternary ammonium ions, each ion having a formula of $[N-R^1R^2R^3R^4]^+$ wherein within such mixture of quaternary ammonium ions, $R^1$ is a mixture of branched alkyl chains; where each branched alkyl chain has a linear alkyl backbone bearing one or more branching alkyl groups, where said branching alkyl groups are independently selected from the group of methyl, ethyl and propyl, where said branched alkyl chain has a total number of carbon atoms between 12 and 22; and wherein the branching positions along the linear alkyl backbones varies within the mixture of branched alkyl chains;

$R^2$ and $R^3$ are selected from $R^1$, a methyl group, an ethyl group and a linear alkyl chain having from 3 to 22 carbon atoms; and wherein $R^4$ is selected from the group consisting of a second linear alkyl group having 1 to 6 carbon atoms, an aryl group and combinations thereof.

27. A composite composition comprising:
a polymeric resin; and
organoclay composition comprising:
a phyllosilicate clay; and
a mixture of quaternary ammonium ions, each ion having a formula of $[N-R^1R^2R^3R^4]^+$ wherein:

$R^1$ is a mixture of branched alkyl groups; each branched alkyl group, within the mixture of branched alkyl groups, having 12 to 22 total carbon atoms, a linear backbone and one or more $C_1$ to $C_3$ branching alkyl groups each being linked to the linear backbone, and within the mixture of branched alkyl groups there is a distribution of carbon positions where the $C_1$ to $C_3$ branching alkyl groups are linked to the linear backbones of the branched alkyl groups;

$R^2$ is a mixture of $R^2$ associated branched alkyl groups; each $R^2$ associated branched alkyl group, within the mixture of $R^2$ associated branched alkyl groups, having 12 to 22 total carbon atoms, a linear backbone and one or more $C_1$ to $C_3$ branching alkyl groups each being linked to the linear backbone, and within the mixture of $R^2$ associated branched alkyl groups there is a distribution of carbon positions where the $C_1$ to $C_3$ branching alkyl groups are linked to the linear backbones of the $R^2$ associated branched alkyl groups; or $R^2$ is first linear alkyl group having 1 to 22 carbon atoms;

$R^3$ is a mixture of $R^3$ associated branched alkyl groups; each $R^3$ associated branched alkyl group, within the mixture of $R^3$ associated branched alkyl groups, having 12 to 22 total carbon atoms, a linear backbone and one or more $C_1$ to $C_3$ branching alkyl groups each being linked to the linear backbone, and within the mixture of $R^3$ associated branched alkyl groups, there is a distribution of carbon positions where the $C_1$ to $C_3$ branching alkyl groups are linked to the linear backbones of the $R^3$ branched alkyl groups; or $R^3$ is first linear alkyl group having 1 to 22 carbon atoms and, wherein $R^4$ is selected from the group consisting of a second linear alkyl group having 1 to 6 carbon atoms, an aryl group and combinations thereof.

\* \* \* \* \*